(12) United States Patent
Fink et al.

(10) Patent No.: US 11,788,975 B2
(45) Date of Patent: Oct. 17, 2023

(54) MEASURING ARRANGEMENT FOR X-RAY RADIATION HAVING REDUCED PARALLAX EFFECTS

(71) Applicant: Bruker AXS GmbH, Karlsruhe (DE)

(72) Inventors: Jürgen Fink, Elchesheim-Illingen (DE); Christian Maurer, Karlsruhe (DE); Lutz Brügemann, Durmersheim (DE); Cristian Venanzi, Karlsruhe (DE)

( * ) Notice: Subject to any disclaimer, the term of this patent is extended or adjusted under 35 U.S.C. 154(b) by 59 days.

(21) Appl. No.: 17/622,738

(22) PCT Filed: Jun. 17, 2020

(86) PCT No.: PCT/EP2020/066807
§ 371 (c)(1),
(2) Date: Dec. 24, 2021

(87) PCT Pub. No.: WO2020/260100
PCT Pub. Date: Dec. 30, 2020

(65) Prior Publication Data
US 2022/0163465 A1    May 26, 2022

(30) Foreign Application Priority Data
Jun. 25, 2019   (DE) .................... 10 2019 209 188.1

(51) Int. Cl.
G01N 23/207    (2018.01)
(52) U.S. Cl.
CPC ..... G01N 23/207 (2013.01); G01N 2223/056 (2013.01)
(58) Field of Classification Search
CPC ........... G01N 23/20008; G01N 23/207; G01N 2223/501; G01N 2223/62
See application file for complete search history.

(56) References Cited

U.S. PATENT DOCUMENTS

| | | | |
|---|---|---|---|
| 2002/0018543 A1* | 2/2002 | Danielsson | G01T 1/24 378/154 |
| 2010/0054415 A1* | 3/2010 | Olivo | G01N 23/041 378/85 |
| 2017/0097309 A1* | 4/2017 | Yoneda | G01N 23/207 |
| 2018/0020996 A1 | 1/2018 | Wang | |

* cited by examiner

*Primary Examiner* — David P Porta
*Assistant Examiner* — Mamadou Faye
(74) *Attorney, Agent, or Firm* — BENOIT & COTE, INC.

(57) ABSTRACT

A measuring arrangement (20) for x-ray radiation, comprising—a sample position (3), which can be illuminated by xray radiation (2) and—an x-ray detector (13) for detecting x-ray radiation emitted from the sample position (3), comprising at least one detector module (21-24), wherein the detector module (21-24) has a plurality of sensor elements (14; 14a-14e) arranged successively in a measuring direction (MR), each sensor element having a centroid (18), wherein the sensor elements (14; 14a-14e) are arranged in a common sensor plane (16) of the detector module (21-24), is characterized in that at least a majority of the sensor elements (14; 14a-14e) of the detector module (21-24), preferably all the sensor elements (14; 14a-14e) of the detector module (21-24), are designed as uniformly spaced sensor elements (14; 14a-14e), wherein the centroids (18) of the sensor elements (14; 14a-14e) have an equal distance R0 from the sample position (3). The measuring arrangement according to the invention can be implemented having flat detector modules, in particular semiconductor detector modules, and is less susceptible to measurement errors.

18 Claims, 12 Drawing Sheets

MEASURING ARRANGEMENT FOR X-RAY RADIATION HAVING REDUCED PARALLAX EFFECTS

The invention relates to a measuring arrangement for x-ray radiation, comprising
- a specimen position capable of being illuminated by an x-ray beam and
- an x-ray detector serving to detect x-ray radiation which emanates from the specimen position and comprising at least one detector module, wherein the detector module comprises a plurality of sensor elements which are arranged in succession in a measurement direction and which each have a centroid, wherein the sensor elements are arranged in a common sensor plane of the detector module.

Such a measuring arrangement has been disclosed by B. Schmitt et al., Nuclear Instruments and Methods in Physics Research A 501 (2003), 267-272 "Mythen detector system" (=[1]).

X-ray radiation can be used for the non-destructive examination of the crystal structure of a specimen to be measured. In the process, the x-ray radiation is diffracted at the lattice planes of the crystals ("crystal planes") in the specimen or the associated atoms. The crystal structure or properties of the specimen to be examined can be deduced from the spatial distribution of the diffracted x-ray radiation.

Different types of x-ray detectors are used for the detection of x-rays. Zero-dimensional x-ray detectors permit the detection of x-ray beams only in a very small solid angle range; therefore, the x-ray detector is typically scanned over a solid angle region of interest during the measurement, for instance using a goniometer. One-dimensional detectors permit a spatially resolved detection of x-ray radiation in one spatial direction. Two-dimensional detectors even permit a spatially resolved detection in two spatial directions, but are comparatively expensive.

An important type of x-ray diffraction measurement is the examination of powder specimens using an x-ray beam, wherein so-called Debye rings occur in the diffraction image. These in each case represent certain lattice spacings in the crystal. On account of the random orientation in relation to the incident x-ray beam of the individual grains in a powder specimen, each grain diffracts the x-ray beam by way of the corresponding lattice planes onto a specified point of the associated Debye ring, and the Debye ring is illuminated substantially uniformly as a result of the totality of the diffractive powder grains. Accordingly, the information about the powder specimen is already found in a small circumferential part of the Debye rings.

Therefore, the spatially resolved evaluation of the diffraction image in any radial direction over the Debye rings suffices for the evaluation of a diffraction image of a powder specimen ("powder diffractogram"). A one-dimensional x-ray detector can be used to this end.

It should be observed that one-dimensional measurement information may also be sufficient in other types of x-ray measurements in order to obtain desired information about a specimen.

Detector modules for one-dimensional x-ray detectors can be designed as semiconductor detector modules, in which an active zone, in which x-ray radiation can be detected, is subdivided into (frequently strip-shaped) sensor elements by means of which a spatial resolution is attained; cf., for example, G. Lutz, "Semiconductor Radiation Detectors—Device Physics", Springer-Verlag Berlin, $2^{nd}$ edition 2007, pages 109-111 and 229-233 (=[2]).

As a matter of principle, semiconductor detector modules are manufactured on plane substrates (wafers). In the case of semiconductor detector modules for a one-dimensional detection in the prior art, the sensor elements are strung along on the substrate in a straight line and the plane substrate is aligned approximately perpendicular to the x-ray radiation incident from the specimen position. In order to measure an extended angle range (for instance, a polar angle range), it is possible to use a plurality of detector modules in succession; a tilt between the successively arranged detector modules approximately reproduces a circular arc.

Detection errors occur on these plane semiconductor detector modules since the diffracted x-ray radiation emanating from the specimen position propagates radially. X-ray radiation strikes the surface of the semiconductor detector module virtually in perpendicular fashion near the center of the semiconductor detector module (or near the foot of the perpendicular from the specimen position to the detector module) and said x-ray radiation strikes this surface at a significantly flatter angle in edge regions (further away from the foot of the perpendicular), wherein the x-ray radiation in edge regions also has to travel a greater distance from the specimen position to the detector. As a result, there is a distortion of the recorded diffraction image (parallax effect 1, also referred to as "flat detector error"); in particular, (otherwise equal) peaks appear wider in the edge region in comparison with close to the center, i.e., the measured x-ray intensity per unit area on the detector module reduces in the edge regions. Overall, the spatial positions of x-ray photons or general x-ray peaks are detected with an ever-greater error toward the edge regions.

Moreover, what may occur if relatively hard x-ray radiation is used is that an x-ray photon successively passes through a plurality of adjacently located sensor elements in the edge regions of the sensor (further away from the foot of the perpendicular) on account of a noticeable thickness of the sensor elements of a semiconductor detector module, and hence a plurality of sensor elements also come into question for the detection (parallax effect 2, also referred to as "sensor parallax"). This also results in an increasing error toward the edge regions when determining peak positions.

The two parallax effects become ever more pronounced the larger the semiconductor detector module and the smaller the distance between the specimen position and the semiconductor detector module.

The two effects do not occur in a truly circular arc-shaped (or truly spherical) detector since the x-ray beams in that case strike the surface of the detector in perpendicular fashion at each point. However, semiconductor detector modules with a circular arc-shaped active zone are not available to date.

Detector modules for a one-dimensional x-ray detection can also be designed as gas detectors (also called gas-filled proportional detectors), in which an x-ray quantum triggers a charge pulse which runs to opposite edges of the active zone so that the location of incidence on the gas detector can be deduced from the propagation time difference; cf., for example, G. F. Knoll, "Radiation Detection and Measurement", John Wiley and Sons, Inc., New York, Second Edition 1989, page 190 (=[3]), or else F. H. W. Heuck, E. Macherauch, "Forschung mit Röntgenstrahlen Bilanz eines Jahrhunderts (1895-1995)", Springer-Verlag Berlin 1995, pages 359-360 (=[4]).

Such gas detectors can also be formed with a circular arc-shaped active zone; cf. L. Spieß et al., "Moderne Röntgenbeugung-Röntgendiffraktometrie für Materialwissenschaftler, Physiker und Chemiker", B. G. Teubner Verlag/

GWV Fachverlage GmbH, Wiesbaden 2005, figure 4.23, page 126 (=[5]). The aforementioned parallax effects do not occur in this case.

However, gas detectors are limited in the global count rate (usually around 1 Mcps) and have a worse spatial resolution and energy resolution in comparison with semiconductor-based detector modules, and moreover have a restricted shelf life.

Various x-ray detectors and x-ray diffractometers on the basis of semiconductor detector modules or gas detectors have been disclosed in further documents [6]-[16].

OBJECT OF THE INVENTION

It is an object of the invention to present a measuring arrangement which is able to be realized with plane detector modules, in particular semiconductor detector modules, and which is less susceptible to measurement errors.

DESCRIPTION OF THE INVENTION

According to the invention, this object is achieved by a measuring arrangement of the type set forth at the outset, which is characterized in that at least a majority of the sensor elements of the detector module, preferably all sensor elements of the detector module, are designed as uniformly spaced apart sensor elements, for which the centroids of the sensor elements each have the same distance $R0$ from the specimen position.

Within the scope of the invention, provision is made for a detector module, in particular a semiconductor detector module, to be designed and aligned relative to the specimen position such that the centroids of at least the majority of the sensor elements, and preferably of all sensor elements, have the same distance $R0$ from the specimen position. Each sensor element whose centroid has the distance $R0$ from the specimen position is referred to as a "uniformly spaced apart sensor element".

All that is required in order to be able to configure this with a plane detector module (or plane substrate), in which the sensor elements are arranged in a common sensor plane of the detector module, is to give up the stringing together of the sensor elements (or their centroids) along a straight line, which is conventional in the prior art. This yields an additional degree of freedom when positioning the sensor elements or the centroids. This can be used to set the same distance $R0$ from the specimen position, as provided for by the invention. Within the scope of the invention, there is, for that reason, a stringing together of the sensor elements or the centroids thereof along a curved trajectory (i.e., corresponding to a "curved measurement direction"), specifically a circular trajectory, on the detector module.

As a result of the sensor strips or their centroids having the same distance $R0$ from the specimen position, a measurement error of the x-ray intensity per active unit area is minimized over the sensor elements of the detector module with the same spacing. Depending on the arrangement of the detector module there is an angle of incidence of the x-ray radiation at the detector module (measured in relation to the perpendicular on the sensor plane) which is generally less than 90°. As a result, parallax errors occur at the detector module or its sensor elements, but these are the same for all sensor elements of a detector module. Accordingly, the intensities (per unit area) measured by the detector module at different locations remain comparable.

The measuring arrangement according to the invention serves to obtain one-dimensional x-ray diffraction information about a measurement specimen (also simply referred to as "specimen") at the specimen position. The plurality of sensor elements (and typically also the uniformly spaced apart sensor elements) are successively arranged in the measurement direction, as a result of which a spatial resolution of the measuring arrangement or of the detector module is configured along this measurement direction. Each position along the measurement direction is represented by a (typically uniformly spaced apart) sensor element. The sensor elements typically have a strip-shaped embodiment.

A detector module typically comprises at least 10, preferably at least fifty, particularly preferably at least 100 uniformly spaced apart sensor elements. The centroid of a sensor element relates to its measuring region (entrance window, active zone) for x-ray radiation to be measured.

Preferred Embodiments

In a preferred embodiment of a measuring arrangement according to the invention, provision is made for the sensor plane to be located in a sectional plane which intersects an auxiliary sphere with the radius $R0$ around the specimen position such that the centroids of the uniformly spaced apart sensor elements are located on a circular first line of intersection of the sectional plane with the auxiliary sphere, wherein the circular first line of intersection has a radius $R1$, and for the sectional plane to be located at a distance from the specimen position. This is a particularly simple option for configuring uniformly spaced apart sensor elements. Typically, a detector module only covers no more than a semicircle with sensor elements since the latter (in the case of a suitable placement/orientation) is sufficient to receive all of the diffraction information of the specimen from the entire circular first line of intersection; however, it is also possible to use a larger portion of the first line of intersection. As a result of the sectional plane being located at a distance from the specimen position, i.e., $R1<R0$, the sensor elements can be irradiated with x-ray radiation on their flat side. The smaller $R1$ in comparison with $R0$, the greater the angle of incidence on the sensor element and the smaller parallax effect 2. Therefore, it is generally preferable to choose $R1 \leq 0.75*R0$. It should be observed that provision can alternatively also be made for the sectional plane to be placed through the specimen position, i.e., for $R1=R0$ to be chosen; in this case, the sensor elements are irradiated via an edge ("edge on").

In a preferred embodiment, the measuring arrangement furthermore comprises an x-ray source which directs an x-ray beam at the specimen position along a direction of irradiation, in particular wherein a specimen to be examined is arranged at the specimen position. The x-ray beam can be diffracted at the measurement position in the specimen to be examined, as a result of which information about the crystal structure of the specimen is obtained. A polar angle can be defined for each centroid of a sensor element and measured between the direction of irradiation and a connecting straight line between the specimen position and this centroid. Within the scope of the invention, the polar angles can be configured differently for the various centroids of the uniformly spaced apart sensor elements of a detector module.

An embodiment in which at least the uniformly spaced apart sensor elements are in the form of strip-shaped sensor elements is preferred. Typically, all sensor elements of the detector module are in the form of strip-shaped sensor elements. The strip-shaped sensor elements follow one another on the detector module in respect of the (curved)

measurement direction in order to configure a spatial resolution of the measuring arrangement or of the detector module along this measurement direction. The strip-shaped sensor elements have a longer embodiment in a transverse direction running transversely to the measurement direction than in the measurement direction. A strip-shaped sensor element can (preferably) form a strip-shaped measuring region that is not subdivided in the transverse direction as an individual element, or else it can (alternatively) form a strip-shaped measuring region that is subdivided into sub-pixels in the transverse direction as a combination element; in the latter case, the centroid is determined for the totality of these (contiguous) sub-pixels or for the entire subdivided strip-shaped measuring region, and the (contiguous) sub-pixels at this position in the measurement direction form a single sensor element.

In the case of a preferred development, in which the centroids of the uniformly spaced apart sensor elements are located on the first line of intersection of the sectional plane, an x-ray source illuminates the specimen position with an x-ray beam in the direction of irradiation and the uniformly spaced apart sensor elements have a strip-shaped embodiment, provision is made for a respective strip-shaped uniformly spaced apart sensor element to be aligned such that an auxiliary lateral conical surface with an apex at the specimen position and a cone axis in or counter to the direction of irradiation has a point of intersection with the strip-shaped sensor element at the centroid of the latter, and for the strip-shaped uniformly spaced apart sensor element to extend at least approximately along a second line of intersection of the auxiliary lateral conical surface with the sectional plane. Expressed differently, with its longitudinal direction, a respective strip-shaped sensor element is substantially aligned along possible Debye rings. As a result, the measured diffracted x-ray intensity of a specimen at the specimen position can be maximized. Typically, a strip-shaped sensor element extends with less than 15° deviation from the second line of intersection, preferably with less than 10° deviation, and particularly preferably with less than 5° deviation.

Preferably, the strip-shaped uniformly spaced apart sensor element extends along a tangent of the second line of intersection at the centroid of the sensor element in the sectional plane. This is easy to configure with sensor elements that (individually) extend in a straight line.

A development in which the strip-shaped uniformly spaced apart sensor elements of the detector module have the same effective length EL, over which x-ray radiation emanating from the specimen position can be registered by the respective strip-shaped sensor element, is likewise preferred. As a result, the intensities measured at the different sensor elements or at different positions in the measurement direction are very comparable. In particular, the effective length can be set by way of a mask.

An embodiment in which the detector module has a mask, by means of which a portion of the respective sensor element is shadowed in relation to the specimen position in the case of at least some of the sensor elements of the detector module, is also preferred. In particular, the mask can serve to shadow some of the length of the respective sensor elements (in the transverse direction) in the case of a detector module with strip-shaped sensor elements. As a result of the mask, the centroids of the sensor elements can be aligned, in particular in order to set the centroids of the sensor elements to the radius $R0$. Likewise, the mask can be used to set the measured region (in the transverse direction), optionally in order to set or improve a spatial resolution in the transverse direction.

In a preferred embodiment of the measuring arrangement according to the invention, the measuring arrangement comprises a plurality of detector modules, wherein the sensor planes of the plurality of detector modules are located in a common sectional plane. As described above, the plurality of detector modules are each formed with uniformly spaced apart sensor elements. As a result of using a plurality of detector modules, a relatively large solid angle range can be measured in a simple manner, even without gaps in the case of a suitable arrangement of the active zones of the detector modules. The arrangement of the detector modules in a common sectional plane is particularly simple from a structural point of view. The centroids of the sensor elements of the detector modules can then be located on a (common) first line of intersection of the common sectional plane with an auxiliary sphere with the radius $R0$ around the specimen position, with the first line of intersection having a radius $R1$; typically, the radius $R1$ is then chosen to be relatively large, for instance with $R1 \geq 0.5*R0$. In all of the uniformly spaced apart sensor elements with the centroids on this common first line of intersection, the same angle of incidence of diffracted x-ray radiation occurs in relation to the perpendicular of the common sectional plane (and hence also to the perpendicular of the respective sensor plane), and hence the same parallax error occurs as well.

In an advantageous embodiment the measuring arrangement comprises a plurality of detector modules, wherein the sensor planes of the plurality of detector modules are located in different sectional planes. The plurality of detector modules are each formed as described above with uniformly spaced apart sensor elements (at least in respect of the respective detector module, and preferably in respect of the entire measuring arrangement). As a result of using a plurality of detector modules, a relatively large solid angle range can be measured in a simple manner, even without gaps in the case of a suitable arrangement of the active zones of the detector modules. The use of different sectional planes in this case facilitates a compact structure of the measuring arrangement (in the case of a large solid angle range covered) and also a steep incidence of the diffracted x-ray radiation at the detector, which helps minimize measurement errors.

Preferred is a development of this embodiment, which provides for an auxiliary sphere with the radius $R0$ to be located around the specimen position and said auxiliary sphere to be intersected by the various sectional planes of the detector modules such that the centroids of the uniformly spaced apart sensor elements of a respective detector module are located on a circular first line of intersection of the respective sectional plane with the auxiliary sphere in each case, wherein the respective circular first lines of intersection have the same radius $R1$, and for the respective first sectional planes to be located at a distance from the specimen position. This development is particularly simple and allows, in particular, the use of detector modules with a structurally similar or the structurally same form. Moreover, an angle of incidence for x-ray beams on the sensor elements (i.e., the angle between the incident x-ray radiation and the perpendicular of the respective local sectional plane or local sensor plane) can be configured to be the same for all detector modules by way of the equal $R1$ of all detector modules; the parallax errors are the same everywhere in that case, as a result of which the measurement results of the detector modules among themselves are very comparable.

A development is preferred, in which an x-ray source directs an x-ray beam at the specimen position in a direction of irradiation, said development providing for the centers of the circular first lines of intersection to be located on or near a common base plane which contains the direction of irradiation, in particular wherein the following applies to a respective distance AMG between a respective center and the base plane: AMG≤⅒*R0. This structure is simple and in a compact space can measure information about the entire polar angle range (if desired) of a measurement specimen at the specimen position. The diffracted x-ray beams are incident on the sensor elements in virtually perpendicular fashion, as a result of which parallax effects can be minimized.

A development in which the following applies is also preferred: R1≤⅕*R0, preferably R1≤⅒*R0. Parallax effects can also be minimized by small radii R1 of the first lines of intersection.

Another development of the two embodiments above with a plurality of detector modules provides for the detector modules to each cover a module angle range of x-ray radiation emanating from the specimen position without gaps by way of their sensor elements, and for an overall angle range of x-ray radiation emanating from the specimen position to be covered without gaps by the totality of the detector modules, wherein the overall angle range is greater than each of the module angle ranges. As a result, a large amount of measurement information about a specimen at the specimen position can be obtained within a short period of time, in particular even without having to scan the measuring arrangement or the x-ray detector. The gap-free coverage of the overall angle range can be achieved by virtue of the active zones of the detector modules overlapping or immediately adjoining one another in respect of the angle range of interest. It should be observed that, in the process, the detector modules can remain arranged next to one another (i.e., need not overlap in respect of the direction of incidence of the diffracted x-ray radiation) despite their unavoidable dead zones (around the active zones) since the measurement information of the same angle region is available in azimuthally redundant fashion by way of the associated Debye cone/Debye ring (or at least to a good approximation over a certain portion thereof) and the detector modules or the active zones thereof can be arranged accordingly at azimuthally spaced apart locations.

A preferred development in this respect, in which an x-ray source directs an x-ray beam at the specimen position in a direction of irradiation, provides for the detector modules to each cover a module polar angle range without gaps, and for the totality of the detector modules to cover an overall polar angle range without gaps, wherein associated polar angles are measured in relation to the direction of irradiation. The crystal structure information about a (powdery) measurement specimen is found in the intensity distribution of the diffracted x-ray radiation over a polar angle range of 0-90°, without the azimuth angle being important. Accordingly, this structure can be used to efficiently obtain desired information about the specimen at the specimen position. It should be observed that, as a rule, very small polar angles (e.g., <5°) are not measured in order not to overload the sensor elements by the non-diffracted beam and its scattering cone.

A further development provides for the detector modules to be designed with the geometrically same sequence of the sensor elements, in particular wherein the sensor elements collectively have the same structural embodiment, or for the detector modules to be designed with only two different geometric sequences of the sensor elements, in particular wherein the two geometric sequences are mirror symmetric to one another, and in particular wherein the detector modules with the different geometric sequences are collectively constructed mirror symmetrically with respect to one another. As a result the measuring arrangement becomes producible in a particularly cost-effective and simple manner. This structure can be applied, in particular, if an independent sectional plane is chosen for each detector module but the respective first lines of intersection have the same radius R1.

Preferred is also an embodiment in which an x-ray source directs an x-ray beam at the specimen position along a direction of irradiation, said embodiment providing for the x-ray source or an intermediate focus of the x-ray source to be arranged at a distance R0 from the specimen position, and for a specimen to be measured to be arranged at the specimen position which diffracts the incident x-ray beam such that some of the diffracted x-ray radiation is focused at a distance R0 from the specimen position. This Bragg-Brentano geometry has proven its worth in practice and facilitates very sharp diffraction reflections. It should be observed that the measuring arrangement may also comprise a plurality of x-ray sources which, in particular, have different wavelengths of an x-ray beam provided; the latter can avoid interfering reflection superpositions or interfering x-ray fluorescence by way of a suitable choice of the x-ray radiation generated by the plurality of x-ray sources.

The scope of the present invention also includes the use of a measuring arrangement according to the invention as described above, for measuring a specimen arranged at the specimen position, wherein an x-ray beam is directed at the specimen in a direction of irradiation, wherein x-ray radiation emanating from the specimen is detected by the x-ray detector and wherein the x-ray detector remains stationary or is only rotated around the direction of irradiation while the specimen is measured. This use is particularly suitable for measuring powdery measuring specimens. The measurement structure required is very simple and is well suited to online measurements (preferably with a stationary x-ray detector and stationary x-ray source). A stress measurement can be implemented easily by way of a rotation around the direction of irradiation.

Further advantages of the invention emerge from the description and the drawing. Likewise, the features mentioned above and the features yet to be explained below can according to the invention find use, in each case on their own or together in any combination. The shown and described embodiments should not be construed as a comprehensive list but rather have exemplary character for the purposes of explaining the invention.

DETAILED DESCRIPTION OF THE INVENTION AND DRAWING

Figure 1:
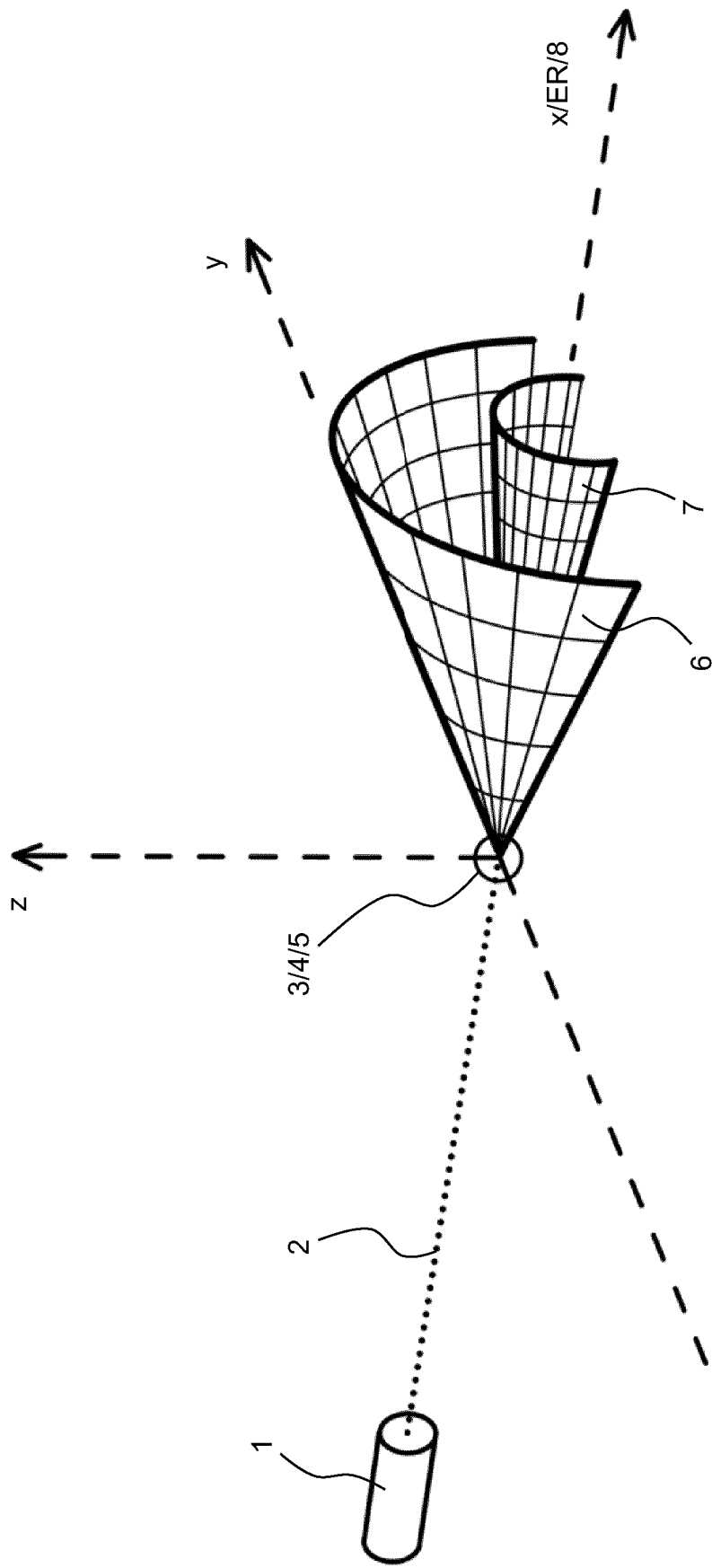
FIG. 1 shows a schematic oblique view of the diffraction of an x-ray beam at a specimen at a specimen position, as occurs in a measuring arrangement according to the invention.

FIG. 1 shows a schematic oblique view of a measurement structure as forms the basis of the present invention. An x-ray source 1, an x-ray tube in this case, emits an x-ray beam 2. This x-ray beam 2 propagates in a direction of irradiation ER (x-direction) and is directed at a specimen position 3, at which a specimen 4 to be measured (not illustrated in more detail) is arranged.

In this case, the specimen 4 is a powdery specimen such that the crystal planes of the powder grains in the specimen 4 are oriented substantially randomly (a corresponding statement would also apply to polycrystalline specimens with an anisotropic orientation of the crystallites in the structure). The diffraction of the x-ray beam 2 at a certain crystal plane of the powder grains leads to a diffracted x-ray beam which is located on a certain auxiliary lateral conical area 6, 7, wherein the apex 5 of the auxiliary lateral conical area 6, 7 is located in the specimen position 3 and the cone axis 8 of the lateral conical area 6, 7 coincides with the direction of irradiation ER. Two auxiliary lateral conical areas 6, 7 which belong to different crystal planes (or to associated lattice spacings) are plotted in exemplary fashion in FIG. 1; these auxiliary lateral conical areas 6, 7 are also referred to as Debye cones. The auxiliary lateral conical areas 6, 7 represent an associated polar angle of the x-ray radiation diffracted at the specific crystal plane, corresponding to half the cone angle of the auxiliary lateral conical area 6, 7. In accordance with the random orientation of the simultaneously irradiated, numerous powder grains of the specimen 4, the auxiliary lateral conical areas 6, 7 are illuminated substantially uniformly by diffracted x-ray radiation in respect of the azimuthal direction ("circumferential direction").

It should be observed that an analogous diffraction of the x-ray beam 2 also occurs in the direction counter to the direction of irradiation ER (i.e., in the −x direction), but this is not shown in any more detail for reasons of simplification.

Figure 2:
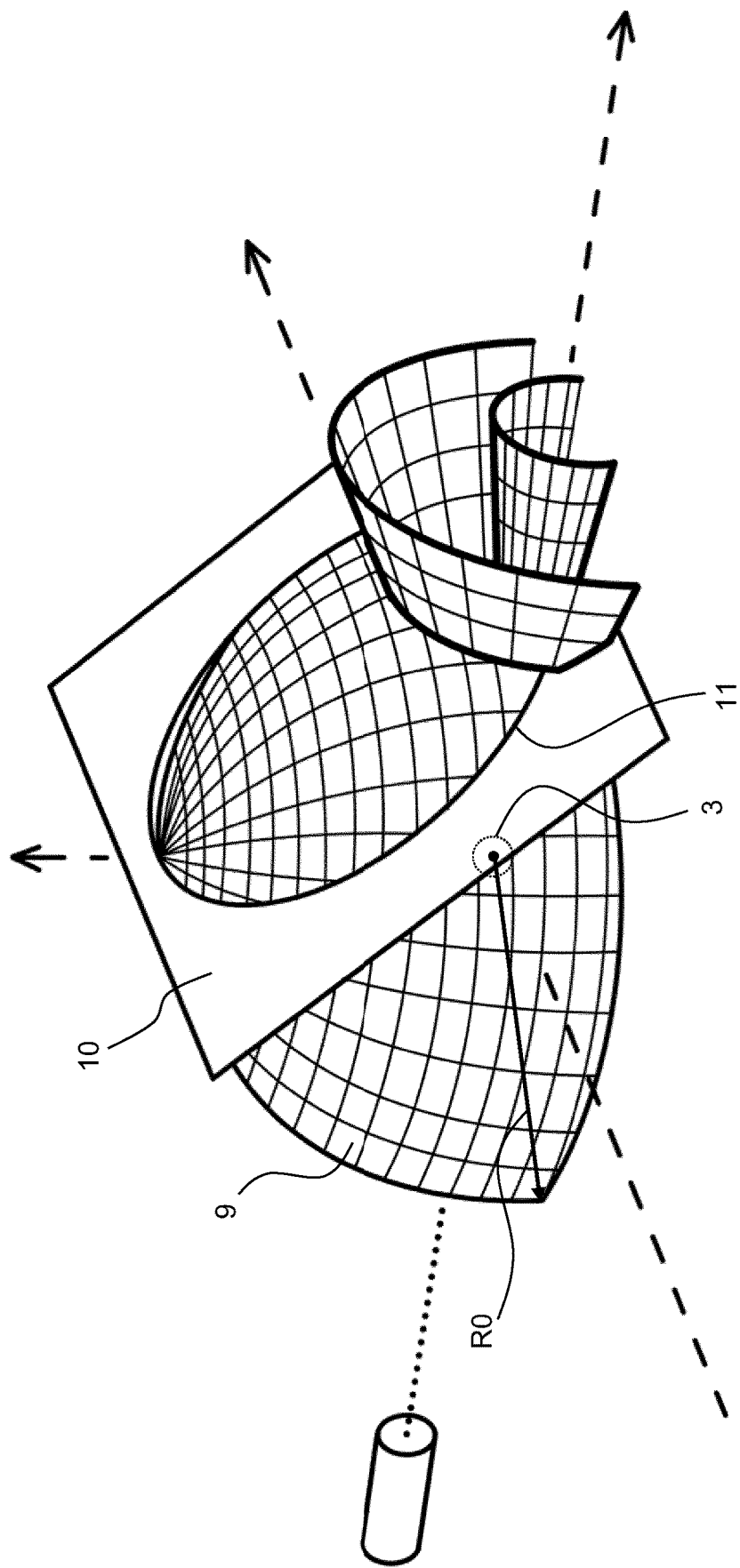
FIG. 2 shows a schematic oblique view of the configuration of a sectional plane and a first line of intersection for arranging uniformly spaced apart sensor elements in accordance with the invention.

Now, an imaginary auxiliary sphere 9 with radius R0 can be arranged around the specimen position 3; cf. FIG. 2. An imaginary sectional plane 10 is placed through this auxiliary sphere 9, with this sectional plane 10 not intersecting the specimen position 3. The sectional plane 10 and the auxiliary sphere 9 have a first line of intersection 11. All locations on this first line of intersection 11 consequently have an identical distance R0 from the specimen position 3.

If the centroids of the sensor elements of a detector module are now arranged such that these are located in the first line of intersection 11, all these centroids have an identical distance R0 from the specimen position 3.

Figure 3:
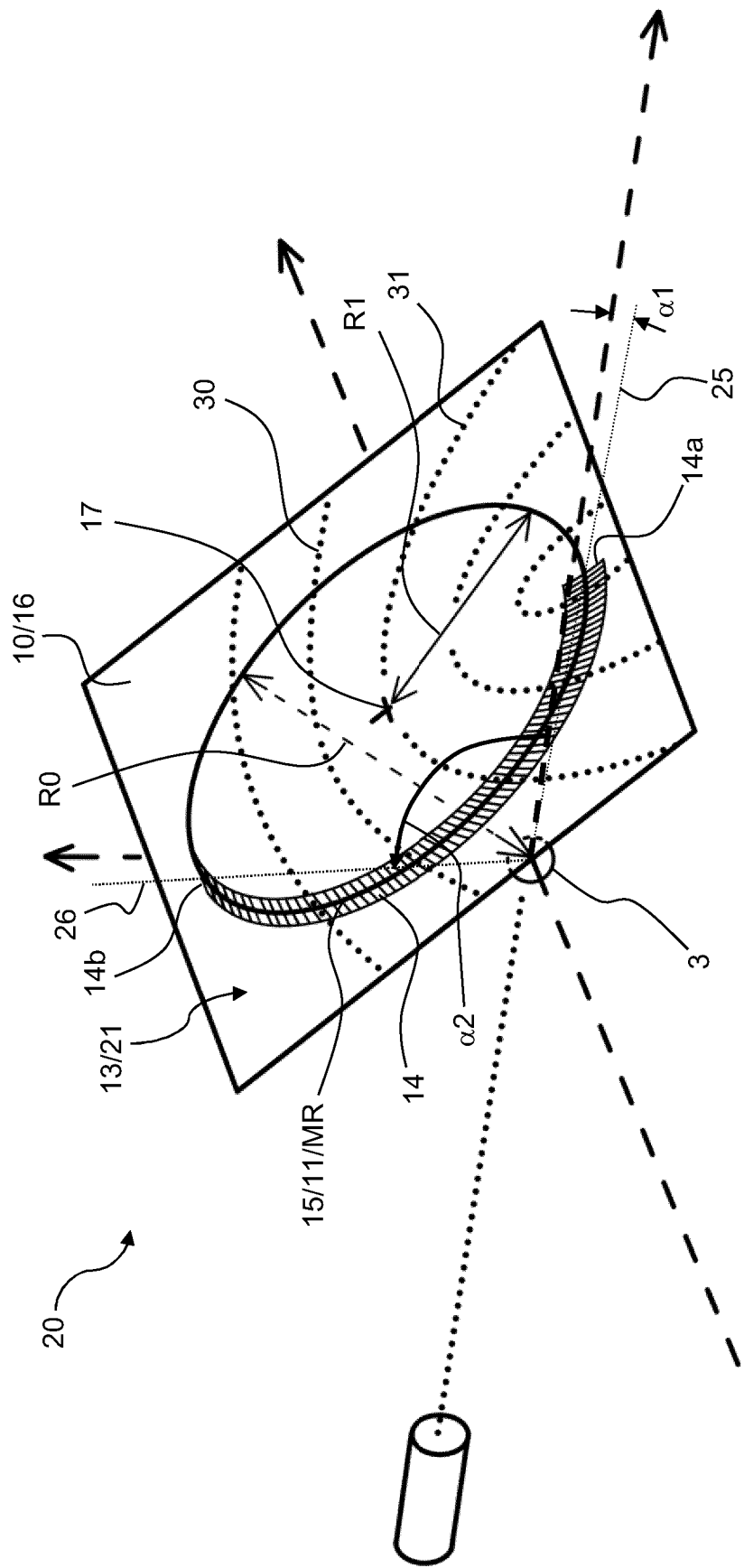
FIG. 3 shows a schematic oblique view of a first embodiment of a measuring arrangement according to the invention, having a single detector module.

In a first embodiment of a measuring arrangement 20 according to the invention, which is illustrated in FIG. 3, an x-ray detector 13 of the measuring arrangement 20 has only a single detector module 21.

This detector module 21 has a multiplicity of sensor elements 14 which are strip-shaped in this case and which are arranged in succession along a circular trajectory 15 with radius R1 around a center 17; the circular trajectory 15 corresponds to the first line of intersection 11. With its curve, the circular trajectory 15 defines a measurement direction MR which extends in arcuate (i.e., curved) fashion, along which the sensor elements 14 are arranged in succession and along which a diffracted x-ray intensity can be measured in spatially resolved fashion using the sensor elements 14.

The sensor elements 14 are all arranged in a common sensor plane 16; this common sensor plane 16 corresponds to the sectional plane 10 and arises structurally from a plane substrate (wafer), on which the sensor elements 14 manufactured from semiconductor material have been deposited.

Figure 4:
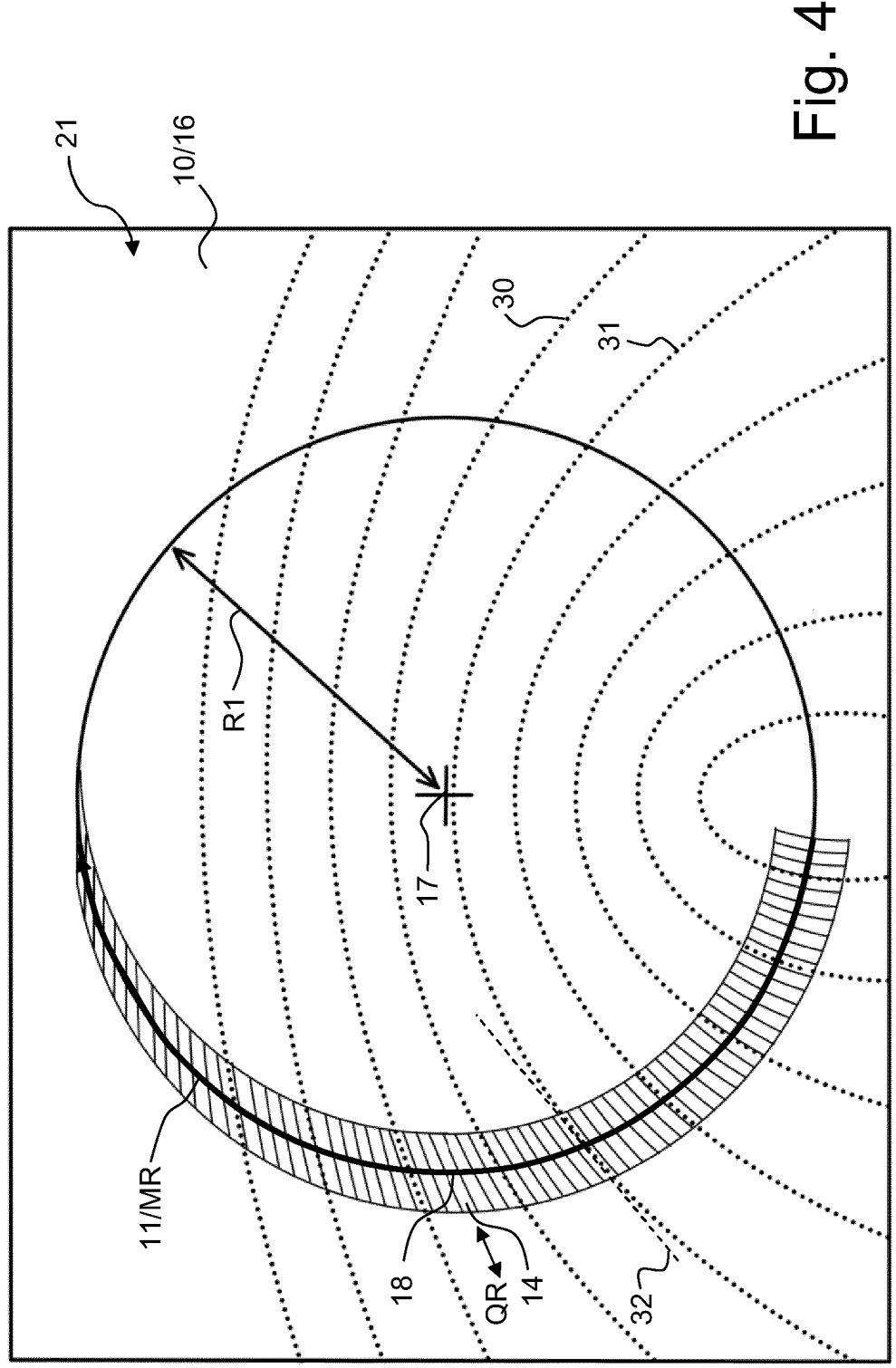
FIG. 4 shows a schematic plan view of the detector module of FIG. 3.

In the plan view of FIG. 4 on the detector module 21 of FIG. 3 it is possible to identify the strip-shaped sensor elements 14, which are strung along the curved measurement direction MR (plotted as a thick black arrow). With their long sides, the sensor elements 14 are aligned along a local transverse direction QR in each case, which extends transversely to the local measurement direction MR (but usually not exactly perpendicular to the local measurement direction MR). The centroids 18 ("centers") of the sensor elements 14 are located exactly on the first line of intersection 11 in each case.

Since the first line of intersection 11 extends on the surface of the auxiliary sphere with radius R0, these centroids 18 all have the distance R0 from the specimen position 3.

The sectional plane 10 or the common sensor plane 16 is also intersected by the auxiliary lateral conical areas (cf. reference signs 6 and 7 in FIG. 1), specifically at second lines of intersection 30, 31; in exemplary fashion, FIG. 4 marks two such second lines of intersection, illustrated using dotted lines, by reference signs 30, 31. It should be observed that second lines of intersection 30, 31 can be determined for all possible polar angles, independently of whether or not corresponding crystal planes in the specimen exist. With their long sides, the strip-shaped sensor elements 14 are each arranged substantially along the local second lines of intersection 30, 31. In particular, to this end a respective strip-shaped sensor element 14 can be arranged with its long sides parallel to a tangent 32, which is in each case placed at a second line of intersection (in this case 31) at the point of intersection with the first line of intersection 11 (or at the associated centroid 18 of the sensor element 14).

In the shown embodiment all strip-shaped sensor elements 14 of the detector module 21 are in the form of uniformly spaced apart sensor elements 14, that is to say with a centroid 18 on the line of intersection 11 and hence with the centroid 18 at a distance R0 from the specimen position.

Moreover, the sensor strips 14 of the detector module 21 covered a closed (gap-free) solid angle range (solid angle interval), specifically a polar angle range, of diffracted x-ray radiation between a polar angle $\alpha 1$ (approximately 5° in this case) at the lowermost sensor element 14*a* and a polar angle $\alpha 2$ (approximately 85° in this case) at the uppermost sensor element 14*b* (cf. FIG. 3 in this respect). The polar angle is the intermediate angle between the respective connecting straight line of the centroid of the sensor element 14 with the specimen position 3 on the one hand and the direction of irradiation ER on the other end, cf. the connecting straight lines 25, 26 to the centroids of the sensor elements 14*a*, 14*b* in FIG. 3. It should be observed that the connecting straight lines 25 and 26 are incident on the sensor plane 16 at the same angle of incidence (measured to a perpendicular/surface normal of the sensor plane, not illustrated in any more detail). It should furthermore be observed that each of the second lines of intersection 30, 31 respectively represent a uniform polar angle.

Figure 5:
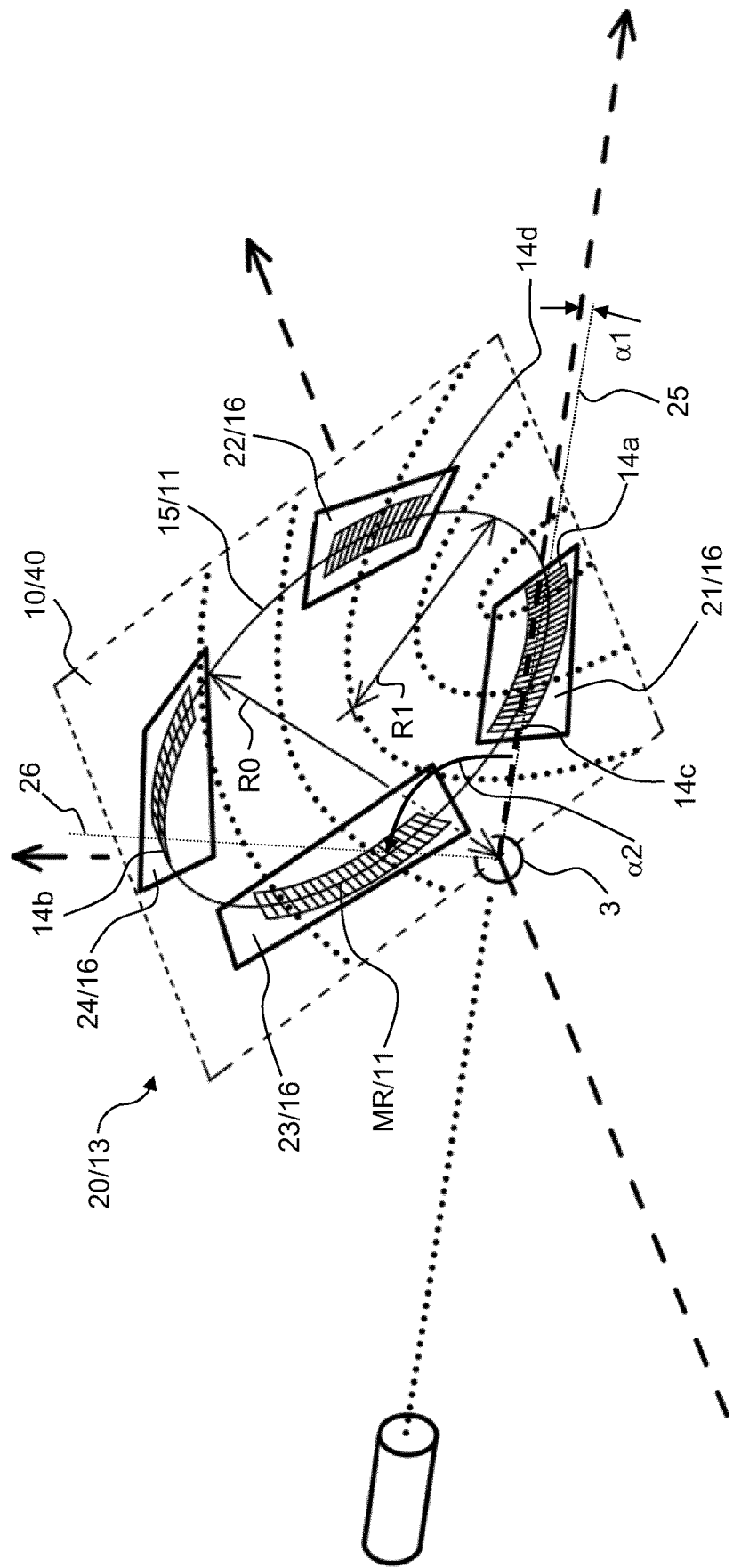
FIG. 5 shows a schematic oblique view of a second embodiment of a measuring arrangement according to the invention, having four detector modules, the sensor planes of which are located in a common sectional plane.

FIG. 5 illustrates a second embodiment of a measuring arrangement 20 according to the invention. In this embodiment, the x-ray detector 13 comprises four detector modules 21, 22, 23, 24 here.

The sectional plane 10, in which the first line of intersection 11 with the imaginary auxiliary sphere with radius R0 is located (not illustrated in any more detail, but cf. FIG. 2 in this respect), is a common sectional plane 40 for all detector modules 21-24 in this case. The sensor planes 16 of all detector modules 21-24 are located in this common sectional plane 40, with the detector modules 21-24 each covering a part of the first line of intersection 11.

The measurement direction MR along the circular arc 15 of the first line of intersection 11 with the radius R1, in which the sensor elements 14 follow one another in a respective detector module 21-24, in this case jumps from detector module 21-24 to detector module 21-24. However, once again, a closed overall solid angle range, in this case an overall polar angle range, between the polar angles $\alpha 1$ (approximately 5° in this case) at the sensor element 14*a* at the connecting straight line 25 and the polar angle $\alpha 2$ (approximately 90° in this case) at the sensor element 14*b* at the connecting straight line 26 is covered by the totality of the detector modules 21-24. In this case, each individual detector module 21-24 respectively covers a module polar angle range of approximately 20-25°. At jumps between detector modules 21-24, for instance between detector modules 21 and 22, the polar angle of the next sensor element 14*d* of the next detector module 22 follows the polar angle of a last sensor element 14*c* of a detector module 21 in directly adjacent fashion (in gap-free fashion) in this case. The angle of incidence between the connecting straight lines 25, 26 and the perpendicular/surface normal of the common sectional plane 40 once again is the same for all sensor elements of the detector module (not illustrated in any more detail).

Figure 6:
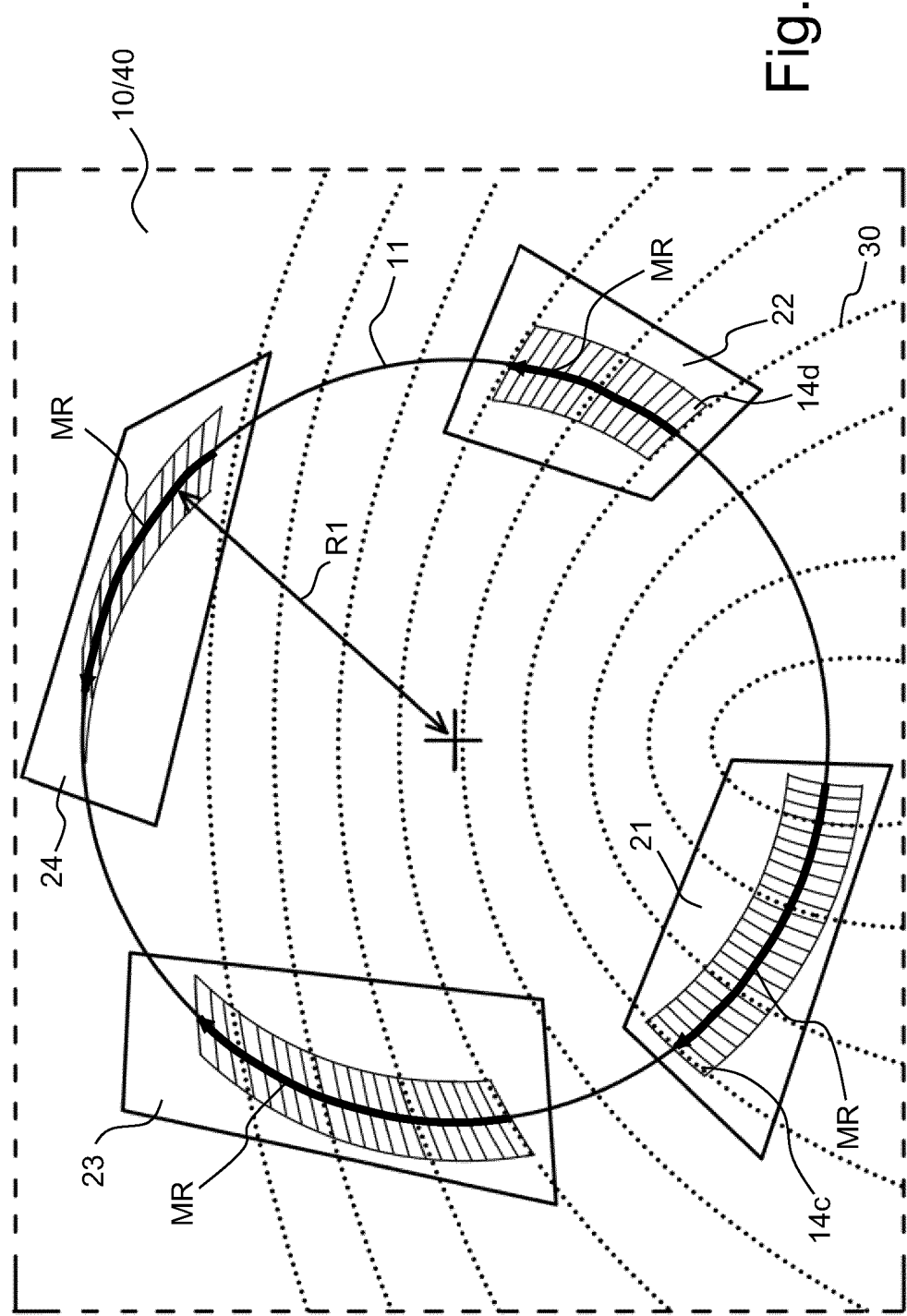
FIG. 6 shows a schematic plan view of the detector modules of FIG. 5.

The gap-free coverage of the overall polar angle range is also easily identifiable in FIG. 6 in the plan view. The sensor elements 14*c* and 14*d* of the detector modules 21 and 22 each adjoin the second line of intersection 30, which represents a certain polar angle, from different sides. Additionally, the sections of the curved and discontinuous measurement direction MR on the detector modules 21-24 are labeled here by arrows drawn in thick lines in each case.

It is noted that an overlap of the polar angle ranges of the detector modules 21-24 may also be set up (not illustrated in any more detail) as an alternative to an adjacent arrangement.

Figure 8:
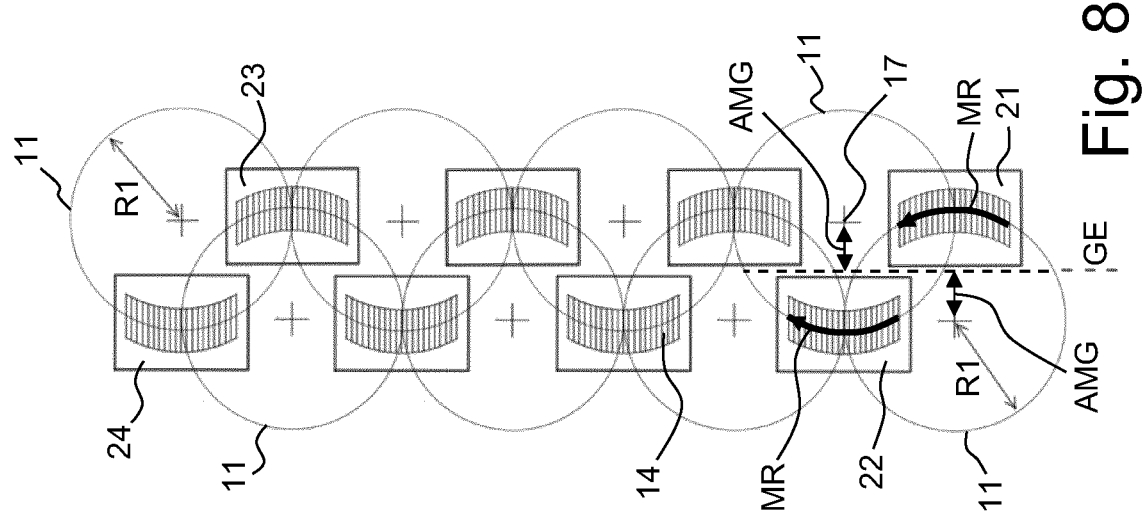
FIG. 8 shows a plane projection of the detector modules of FIG. 7.
Figure 7:
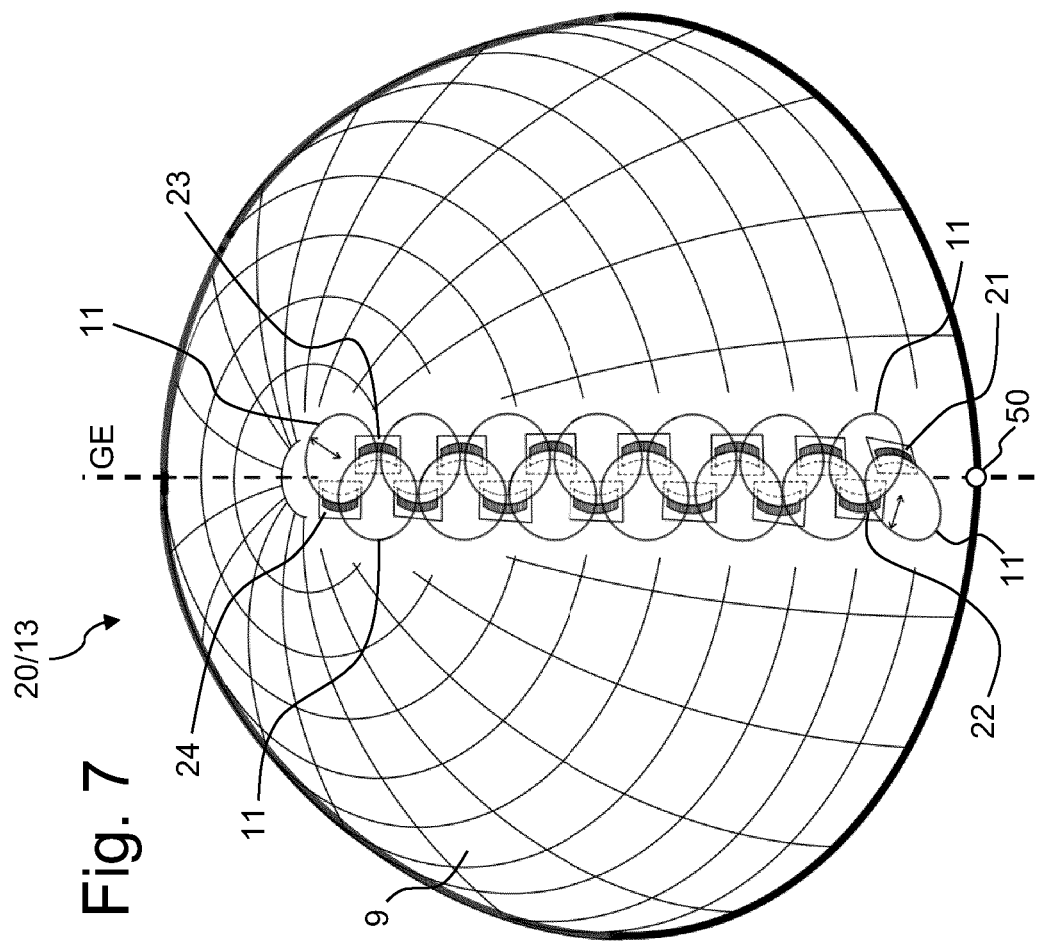
FIG. 7 shows a schematic perspective view of a third embodiment of a measuring arrangement according to the invention, having a multiplicity of detector modules located in different sectional planes, with detector modules having the same structure.

FIG. 7, in an oblique view, and FIG. 8, in a plane projection, illustrate a third embodiment of a measuring arrangement 20 according to the invention, in which the x-ray detector 13 has a multiplicity of detector modules; detector modules 21, 22, 23, 24 are marked in an exemplary manner.

Each detector module 21-24 has a dedicated sectional plane (not illustrated in any more detail here), which intersects the imaginary auxiliary sphere 9 (with radius R0 around the specimen position; this is not illustrated in any more detail here but cf. FIG. 2 in this respect); in each case this yields an independent, local first line of intersection 11 for each detector module 21-24. In the embodiment shown, the radii R1 of the first lines of intersection 11 of the sectional planes of all detector modules 21-24 are identical.

The detector modules 21-24 each have strip-shaped sensor elements 14, the centroids of which are arranged on the respectively associated (local) first line of intersection 11, and accordingly these centroids all have the distance R0 from the specimen position. The respective local, curved measurement direction MR, in which the sensor elements 14 are arranged in succession, follows the curve of the local first line of intersection 11 and once again jumps from detector module to detector module 21-24.

In this case, the detector modules 21-24 and the sensor elements 14 thereof are arranged such that, once again, a closed overall polar angle range is covered by the totality of all detector modules 21-24; the polar angle range covered overall is approximately 80° in this case, wherein each detector module only covers a module polar angle range of approximately 6°. Here, the polar angle ranges covered per detector module 21-24 once again directly adjoin one another.

In the embodiment shown, the detector modules 21-24 each have an identical structure, even though they are oriented in alternating fashion. The detector modules 21-24 are all arranged near a base plane GE, the base plane GE containing the direction of irradiation (cf. the point of intersection 50 of the direction of irradiation with the auxiliary sphere 9). Here, the centers 17 of the first lines of intersection 11 in each case have the same distance AMG from the base plane GE, approximately ½₀*R0 in this case. Here, the radius R1 is approximately ¹⁄₁₇*R0.

In this structure, x-ray radiation emanating from the specimen position strikes the detector modules 21-24 or the sensor planes thereof in virtually perpendicular fashion, as a result of which parallax effects are minimized.

Figure 10:
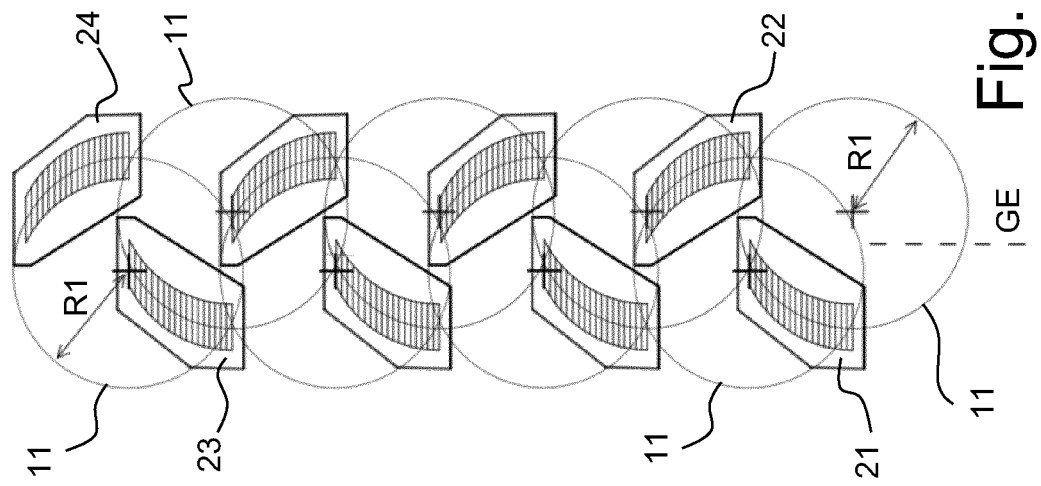
FIG. 10 shows a plane projection of the detector modules of FIG. 9.
Figure 9:
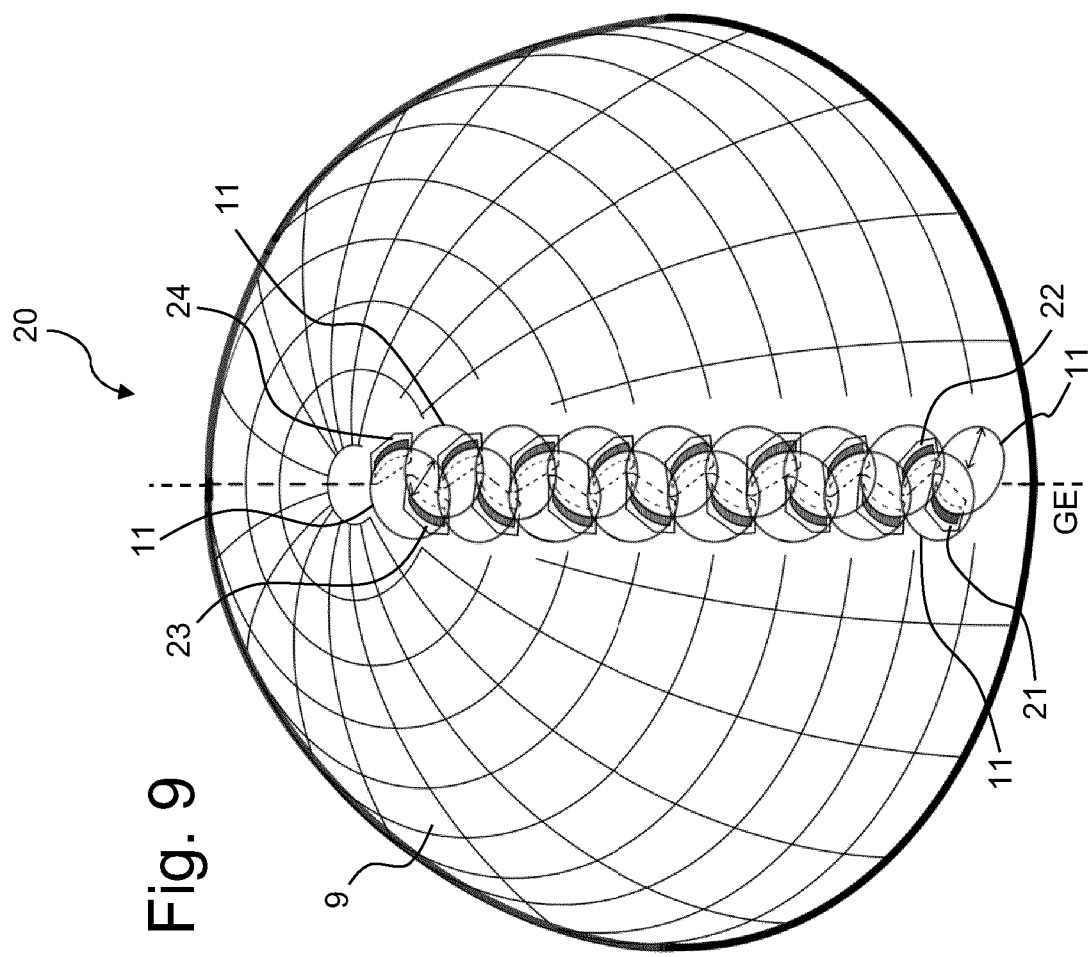
FIG. 9 shows a schematic perspective view of a fourth embodiment of a measuring arrangement according to the invention, having a multiplicity of detector modules located in different sectional planes, having two types of detector modules constructed in mirror symmetric fashion.

It should be observed that in FIG. 7 the respective portion of the sensor elements 14 and the detector modules 21-24 which is located below the cut imaginary auxiliary sphere 9 is illustrated using dashed lines. In the fourth embodiment of a measuring arrangement 20, which is illustrated in an oblique view in FIG. 9 and in a plane projection in FIG. 10, use is made of two mirror-symmetric types of detector modules 21-24; the marked detector modules 21, 23 belong to a first type and the detector modules 22, 24 belong to a second type. As a result, the detector modules 21-24 can be placed slightly closer together and, in particular, can be brought closer to the base plane GE with their centers 17 of the first lines of intersection 11 than in the third embodiment. Otherwise, the fourth embodiment corresponds to the third embodiment.

Figure 11:
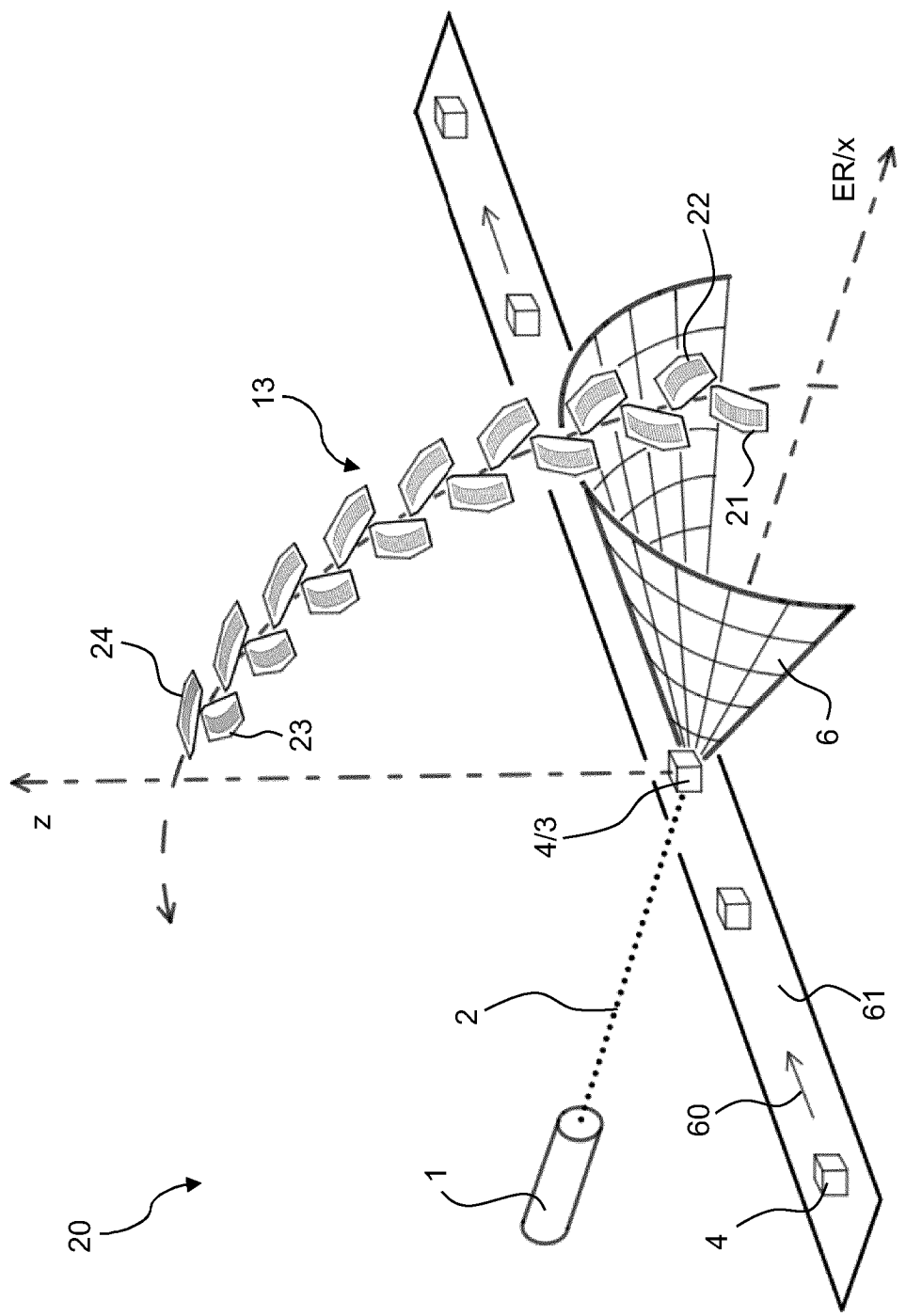
FIG. 11 shows a measuring arrangement according to the invention in accordance with the embodiment of FIG. 10, in an application for quality assurance.

FIG. 11 schematically illustrates an embodiment of a measuring arrangement 20 according to the invention, which is used for online quality control of specimens 4. The structure of the measuring arrangement largely corresponds to the fourth embodiment of FIG. 9 and FIG. 10.

Specimens 4 to be examined are arranged on a conveyor belt 61 and are conveyed via a specimen position 3 by way of said conveyor belt; cf. conveying direction 60. A specimen 4 currently situated at the specimen position 3 is irradiated by an x-ray beam 2 from a stationary x-ray source 1. As a result, diffracted x-ray radiation emanating from the specimen 4 at the specimen position 3 is generated; by way of example, the auxiliary lateral conical area 6 of a certain crystal plane of a specimen constituent has been plotted.

The diffracted x-ray radiation is measured using an x-ray detector 13. The x-ray detector 13 comprises a multiplicity of detector modules; detector modules 21, 22, 23 and 24 are marked in exemplary fashion. A closed overall polar angle range can be monitored simultaneously using the detector modules 21-24, and so it is not necessary to rotate or otherwise move the x-ray detector 13 or the detector modules 21-24 for the purposes of checking the specimen 4; accordingly, the x-ray detector 13 is likewise stationary in this case. In particular, all possible x-ray reflections generated by the specimen 4 can be measured simultaneously in the covered overall polar angle range.

Within the scope of the measurement of the specimens 4, it is possible to quickly identify contaminations in a specimen 4 or too few or too many specimen constituents present, and optionally specimens 4 with an insufficient quality can be rejected accordingly.

Figure 12:
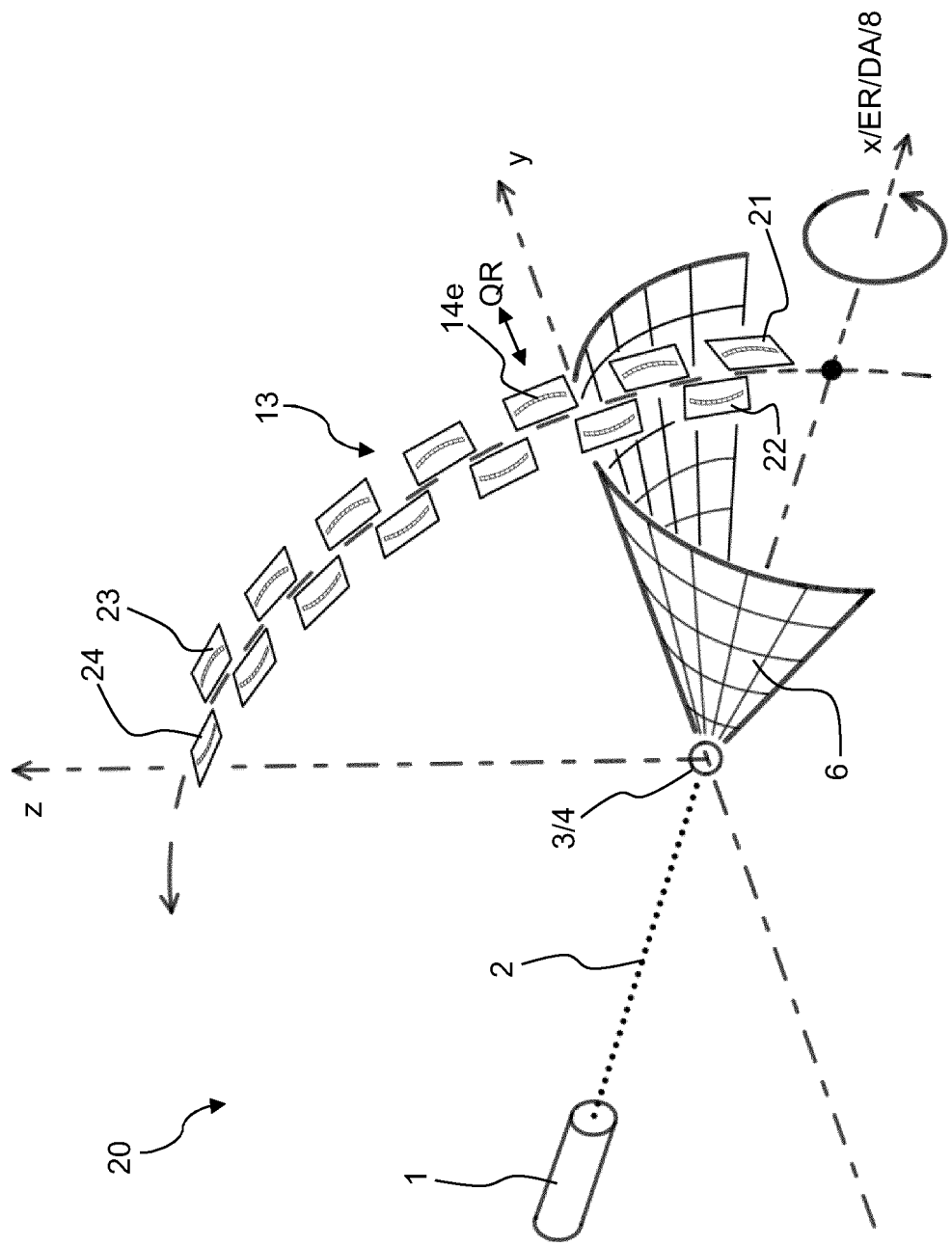
FIG. 12 shows a measuring arrangement according to the invention in accordance with the embodiment of FIG. 8, in an application for stress measurement.

FIG. 12 shows an embodiment of a measuring arrangement 20 which can be used for a stress measurement (measurement of elastic stresses). The embodiment largely corresponds to the third embodiment of FIG. 7 and FIG. 8.

A powdery specimen 4 (not illustrated in any more detail) at the specimen position 3 is irradiated by an x-ray beam 2 from the x-ray source 1. As a result, diffracted x-ray radiation which is distributed in rotationally symmetric fashion around the direction of irradiation ER arises in the stress-free state of the specimen 4; cf. the exemplary auxiliary lateral conical area 6, which is rotationally symmetric around the cone axis 8, for a certain crystal plane of the specimen 4. The diffracted x-ray radiation can be detected using an x-ray detector 13 comprising a multiplicity of detector modules, which have been marked with 21-24 in exemplary fashion. In the totality thereof, the detector modules 21-24 cover a closed polar angle range of approximately 80° in this case.

It should be observed that the detector modules 21-24 each have a multiplicity of successive, approximately square sensor elements 14e. Thus, the sensor elements 14e only have a small measuring range in the transverse direction QR.

If the specimen 4 has elastic stresses (for example as a result of a directed compression of the specimen 4), there is a distortion in a respective auxiliary lateral conical area 6 belonging to a lattice plane. By way of example, the radius of the auxiliary lateral conical area 6 can in the region of the detector modules 21-24 be slightly larger in the y-direction than in the z-direction. This distortion can be recognized and determined by virtue of the x-ray detector 13 or the totality of the detector modules 21-24 being rotated around an axis of rotation DA which corresponds to the direction of irradiation ER of the x-ray beam 2 and a measurement of the diffracted x-ray radiation being implemented in different rotational positions of the x-ray detector 13 around the axis of rotation DA, for example in the position shown in FIG. 12 and in a position which has been rotated through 90° around the axis of rotation DA in relation thereto.

Figure 13:
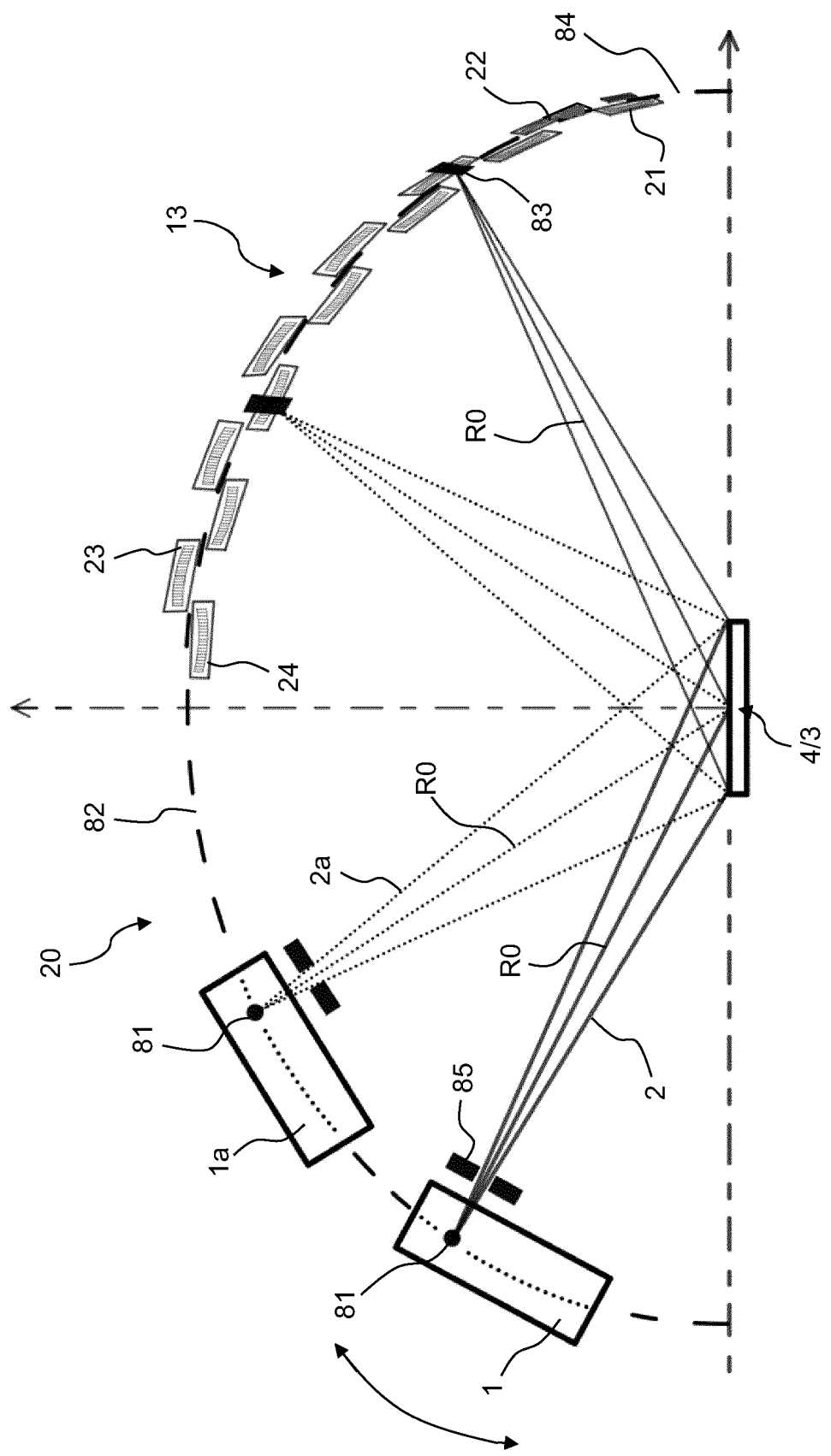
FIG. 13 shows a measuring arrangement according to the invention in accordance with the embodiment of FIG. 8, when using two x-ray sources of different wavelength in a Bragg-Brentano geometry.

FIG. 13 shows a further embodiment of a measuring arrangement 20 according to the invention in a Bragg-Brentano geometry.

In this structure, an x-ray source 1 generates an x-ray beam 2 (cf. the full beam lines), which is diffracted at the specimen 4 at the specimen position 3. In this case, the x-ray source 1 or the source focus 81 thereof is situated at a distance R0 from the specimen position 3 (it should be observed that the size of the specimen 4 and the divergence of the x-ray beam 2 are illustrated here in greatly exaggerated fashion).

Accordingly, the diffracted x-ray beam is also focused at a distance R0 from the specimen position 3 ("para-focusing geometry").

The centroids of the sensor elements 14 of the detector modules, marked here by 21-24 in exemplary fashion, are arranged at the distance R0 from the specimen position. As a result, particularly sharp diffraction reflections and, accordingly, a particularly high resolution of the diffraction measurement of the specimen 4 can be obtained.

It should be observed that the x-ray source 1 in the Bragg-Brentano geometry is usually scanned over the circular arc 82 with the radius R0 in order to obtain the diffraction information from the specimen 4; accordingly, there is also a movement in the position of the focus 83 of the diffracted x-ray beam over a circular arc 84, close to which the detector modules 21-24 are arranged.

As a result of a large, contiguous overall polar angle range (approximately 80° in this case) being covered by means of the x-ray detector 13, i.e., the totality of the detector modules 21-24, it is generally not necessary to move the x-ray detector 13 during such a scan; this is particularly simple from a structural point of view. Moreover, the specimen 4 can be measured substantially quicker and/or with more signal intensity per angle element (in comparison with a measurement of a respective diffracted reflection with a zero-dimensional detector in relation to a respective scan position of the x-ray source 1).

If desired, a further x-ray source 1a can be provided in addition to the x-ray source 1, the former being operated at a wavelength that deviates from that of the x-ray source 1; cf. the further x-ray beam 2a (illustrated using the dotted line). The further x-ray source 1a or the source focus 81 thereof is likewise arranged at the distance R0 from the specimen position 3. A diffraction measurement at the specimen 4 can be carried out by the two x-ray sources 1, 1a in alternative, simultaneous or successive fashion. If there is a superposition of diffraction reflections of different specimen constituents at one wavelength, this usually does not occur at the other wavelength. Moreover, the other wavelength can usually avoid the excitation of an x-ray fluorescence of a specimen constituent which occurs at one wavelength (and reduces the reflection-to-background ratio).

It should be observed that on account of the perspective illustration of FIG. 13, the circular arc 82 (with radius R0 and circle center at the center of the specimen position 3) and the circular arc 84 (likewise with radius R0 and circle center at the center of the specimen position 3) are illustrated with a slight elliptic distortion.

Figure 14:
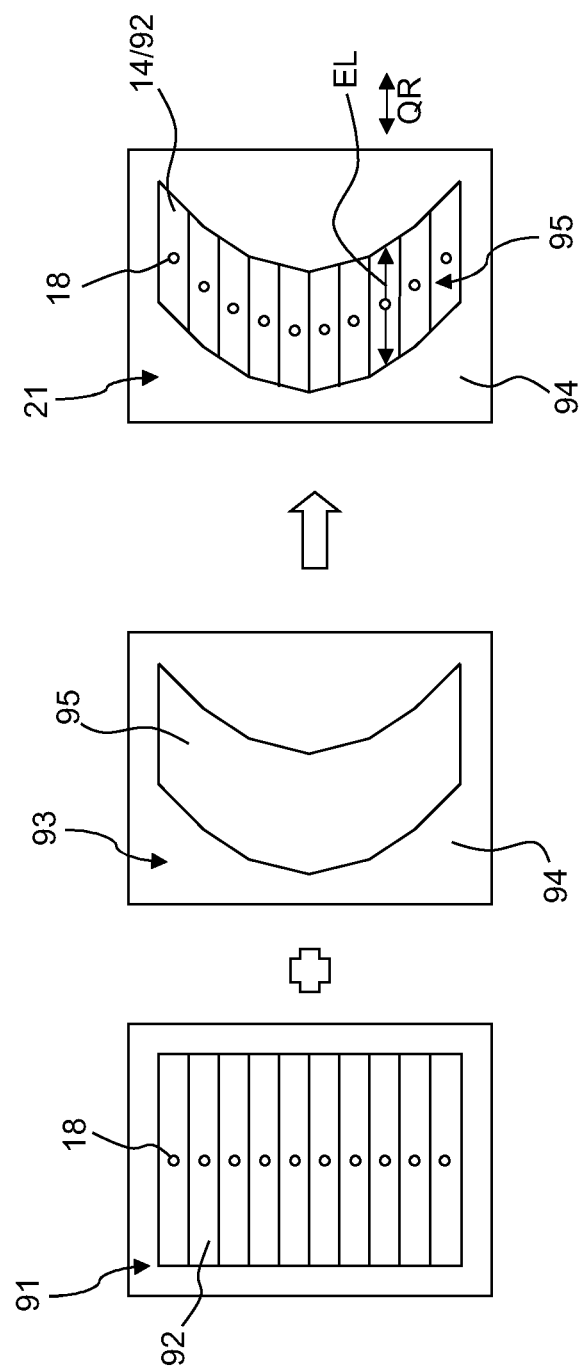
FIG. 14 shows a schematic plan view of a detector module according to the invention, with a partial coverage of strip-shaped sensor elements by a mask.

FIG. 14 explains, in exemplary fashion, the configuration of a detector module 21 with a sequence of sensor elements 14 whose centroids 18 do not follow one another along a straight line but along a circular arc, for use with the invention.

In the simplest case, the detector modules 21 are originally manufactured on the substrate (wafer) of the detector module 21 with sensor elements of the desired sequence of centroids 18 along a circular arc.

However, it is also possible to use a mask 93 (illustrated in the center) of radiopaque material, for instance a sufficiently thick layer of lead, to shadow a conventional detector module 91 which has a sequence of in this case strip-shaped sensor elements 92 with the centroids ("centers" of the x-ray-sensitive area) in a straight line (illustrated on the left). The mask 93 has a shadowing edge 94 and a passage opening 95.

If the mask 93 is arranged on the conventional detector module 91, parts of the sensor elements 92 can be covered and shadowed from the specimen position. Effective sensor elements 14 remain following the coverage (illustrated to the right), the centroids 18 of said effective sensor elements following one another in the desired manner, specifically along a circular line (cf. the first line of intersection 11, for example in FIG. 3), and the detector module 21 modified in this way can be used within the scope of the invention.

Independently of whether a detector module 21 is manufactured at the outset or obtained by shadowing with a mask 93, the uniformly spaced apart sensor elements 14 of the detector module 21 (and typically all sensor elements 14 of the detector module 21) preferably have the same effective length EL (measured in the transverse direction QR), and so the x-ray intensities measured by the various sensor elements 14 are very comparable. The centroids 18 are determined by the (actually usable, not shadowed) sensor elements 14; a respective centroid 18 can be determined on the surface of the sensor element 14 facing the specimen position.

LIST OF REFERENCE SIGNS

1 X-ray source
1a Further x-ray source
2 X-ray beam
2a Further x-ray beam
3 Specimen position
4 Specimen
5 Apex
6, 7 Auxiliary lateral conical area/surface
8 Cone axis
9 Auxiliary sphere
10 Sectional plane
11 First line of intersection
13 X-ray detector
14 (Strip-shaped) sensor element
14a (Lowermost) sensor element
14b (Uppermost) sensor element
14c (Last) sensor element
14d (Next) sensor element
14e (Square) sensor element
15 Circular line
16 Common sensor plane
17 Center of the first line of intersection
18 Centroid
20 Measuring arrangement
21-24 Detector module
25, 26 Connecting straight line
30, 31 Second line of intersection
32 Tangent
40 Common sectional plane
50 Point of intersection of the direction of irradiation
60 Conveying direction
61 Conveyor belt
81 Source focus
82 Circular arc
83 Focus of the diffracted x-ray beam
84 Circular arc
85 Stop slit
91 Conventional detector module
92 Sensor elements arranged in a straight line/partly shadowed
93 Mask
94 Radiopaque edge
95 Passage opening
$\alpha 1$ Polar angle
$\alpha 2$ Polar angle
AMG Distance between center and base plane
EL Effective length
ER Direction of irradiation
DA Axis of rotation
GE Base plane
MR Measurement direction
QR Transverse direction
R0 Radius of the auxiliary sphere
R1 Radius of the first line of intersection
X Spatial coordinate
Y Spatial coordinate
Z Spatial coordinate

CITATIONS

| | |
|---|---|
| [1] | B. Schmitt et al., Nuclear instruments and Methods in Physics Research A 501 (2003), 267-272 "Mythen detector system" |
| [2] | G. Lutz, "Semiconductor Radiation Detectors - Device Physics", Springer-Verlag Berlin, $2^{nd}$ Edition 2007, pages 109-111 and 229-233 |
| [3] | G. F. Knoll, "Radiation Detection and Measurement", John Wiley and Sons, Inc., New York, Second Edition 1989, page 190 |
| [4] | F. H. W. Heuck, E. Macherauch, "Forschung mit Röntgenstrahlen Bilanz eines Jahrhunderts (1895-1995)", Springer-Verlag Berlin 1995, pages 359-360 |
| [5] | L. Spieß et al., "Moderne Röntgenbeugung - Röntgendiffraktometrie für Materialwissenschaftler, Physiker und Chemiker", B. G. Teubner Verlag/GWV Fachverlage GmbH, Wiesbaden 2005, page 126 |
| [6] | ARL EQUINOX 100 Benchtop x-ray diffractometer, Thermo Fisher Scientific, Company brochure "Thermo Scientific ARL EQUINOX 100 X-ray diffractometers", November 2018 |
| [7] | FCT-ACTech Continuous On Stream Mineral Analyser COSMA http://www.fct-actech.com/site/pages/equipment.php Downloaded on Feb. 8, 2019 |
| [8] | INEL Inc., Stratham NH, USA; http://www.inel.us/index.php/accessories-xrd-inel-company/detecter-curved-inel-company Downloaded on Feb. 8, 2019 |
| [9] | Arc detector CirPAD by imXPAD in cooperation with Synchrotron SOLEIL, Gif-sur-Yvette, France https://www.synchrotron-soleil.fr/en/news/new-detector-diffabs-fast-measurements-x-ray-diffraction-images Downloaded on Feb. 7, 2019 |
| [10] | Arc detector CirPAD in the presentation: "Résolution de structures à partir de diagrammes de diffraction de poudres", Erik Elkaim, Ecole de Cristallographie Oct. 17-21, 2016, slide 12 therein |
| [11] | Ch. Broennimann et al., J. Synchrotron Rad. (2006), 13, 120-130 "The PILATUS 1M Detector" |

| [12] | HyPix-Arc 150°, Rigaku, https://www.rigaku.com/en/arc Downloaded on Feb. 8, 2019 |
| --- | --- |
| [13] | Company brochure "Xstress 3000 G3/G3R", Stresstech GmbH, Rennerod, DE, undated, Downloaded on Feb. 8, 2019 |
| [14] | SmartSite RS portable stress analyzer, Rigaku, https://www.rigaku.com/en/products/xrd/smartsite-rs Downloaded on Feb. 8, 2019 |
| [15] | US 2017/0097309 A1 |
| [16] | International Tables for Crystallography, figure 2.3.4.1 |

The invention claimed is:

1. A measuring arrangement for x-ray radiation, comprising:
a specimen position capable of being illuminated by an x-ray beam; and
an x-ray detector serving to detect x-ray radiation which emanates from the specimen position and comprising at least one detector module, wherein the detector module comprises a plurality of sensor elements which are arranged in succession in a measurement direction and which each have a centroid, wherein the sensor elements are arranged in a common sensor plane of the detector module, and wherein at least a majority of the sensor elements of the detector module are designed as uniformly spaced apart sensor elements, for which the centroids of the sensor elements each have the same distance R0 from the specimen position.

2. The measuring arrangement as claimed in claim 1, wherein the sensor plane is located in a sectional plane which intersects an auxiliary sphere with radius R0 around the specimen position such that the centroids of the uniformly spaced apart sensor elements are located on a circular first line of intersection of the sectional plane with the auxiliary sphere, wherein the circular first line of intersection has a radius R1, and wherein the sectional plane is located at a distance from the specimen position.

3. The measuring arrangement as claimed in claim 1, wherein the measuring arrangement furthermore comprises an x-ray source which directs an x-ray beam at the specimen position along a direction of irradiation.

4. The measuring arrangement as claimed in claim 1, wherein at least the uniformly spaced apart sensor elements are in the form of strip-shaped sensor elements.

5. The measuring arrangement as claimed in claim 4, wherein a first one of the strip-shaped uniformly spaced apart sensor elements is aligned such that an auxiliary lateral conical surface with an apex at the specimen position and a cone axis in or counter to the direction of irradiation has a point of intersection with the strip-shaped sensor element at the centroid thereof, and the first strip-shaped uniformly spaced apart sensor element extends at least approximately along a second line of intersection of the auxiliary lateral conical surface with the sectional plane.

6. The measuring arrangement as claimed in claim 5, wherein the first strip-shaped uniformly spaced apart sensor element extends along a tangent of the second line of intersection at the centroid of the sensor element in the sectional planed.

7. The measuring arrangement as claimed in claim 4, wherein the strip-shaped uniformly spaced apart sensor elements of the detector module have the same effective length, over which x-ray radiation emanating from the specimen position can be registered by the first strip-shaped sensor element.

8. The measuring arrangement as claimed in claim 1, wherein the detector module has a mask, by means of which at least a portion of said sensor elements is shadowed in relation to the specimen position.

9. The measuring arrangement as claimed in claim 1, wherein the detector module is one of a plurality of detector modules having respective sensor planes located in a common sectional plane.

10. The measuring arrangement as claimed in claim 1, wherein the detector module is one of a plurality of detector modules having respective sensor planes located in different sectional planes.

11. The measuring arrangement as claimed in claim 10, wherein an auxiliary sphere with radius R0 is located around the specimen position and said auxiliary sphere is intersected by the various sectional planes of the detector modules such that the centroids of the uniformly spaced apart sensor elements of a respective detector module are located on a circular first line of intersection of the respective sectional plane with the auxiliary sphere, wherein the respective circular first lines of intersection have the same radius R1, and wherein the respective sectional planes are located at a distance from the specimen position.

12. The measuring arrangement as claimed in claim 11, wherein the circular first lines of intersection are centered on or near a common base plane which contains a direction of irradiation of the specimen.

13. The measuring arrangement as claimed in claim 11, wherein $R1 \leq \frac{1}{5}*R0$.

14. The measuring arrangement as claimed in claim 1, wherein the detector module is one of a plurality of detector modules that each cover a module angle range of x-ray radiation emanating from the specimen position without gaps by way of their sensor elements, and an overall angle range of x-ray radiation emanating from the specimen position is covered without gaps by the totality of the detector modules, and wherein the overall angle range is greater than each of the module angle ranges.

15. The measuring arrangement as claimed in claim 14, wherein the detector modules each cover a module polar angle range without gaps, and the totality of the detector modules covers an overall polar angle range without gaps, wherein associated polar angles are measured in relation to a direction of irradiation of the specimen.

16. The measuring arrangement as claimed in claim 1, wherein the detector module is one of a plurality of detector modules designed with the same geometric sequence of sensor elements.

17. The measuring arrangement as claimed in claim 1, wherein an x-ray source which directs an x-ray beam at the specimen position along a direction of irradiation, or an intermediate focus of the x-ray source, is arranged at a distance R0 from the specimen position, and wherein a specimen to be measured is arranged at the specimen position which diffracts the incident x-ray beam such that some of the diffracted x-ray radiation is focused at a distance R0 from the specimen position.

18. The use of a measuring arrangement as claimed in claim 1 for measuring a specimen arranged at the specimen position, wherein an x-ray beam is directed at the specimen in a direction of irradiation, wherein x-ray radiation emanating from the specimen is detected by the x-ray detector, and wherein the x-ray detector remains stationary or is rotated only around the direction of irradiation while the specimen is measured.

\* \* \* \* \*